(12) United States Patent
Blanvillain et al.

(10) Patent No.: US 8,249,792 B2
(45) Date of Patent: Aug. 21, 2012

(54) METHOD AND DEVICE FOR THE ENERGY PROTECTION OF AN AIRCRAFT

(75) Inventors: Emmanuel Blanvillain, Toulouse (FR); Florian Constans, Reidisheim (FR); David Chabe, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 639 days.

(21) Appl. No.: 12/575,286

(22) Filed: Oct. 7, 2009

(65) Prior Publication Data

US 2010/0100262 A1 Apr. 22, 2010

(30) Foreign Application Priority Data

Oct. 9, 2008 (FR) ...................................... 08 05576

(51) Int. Cl.
*G06F 19/00* (2006.01)
(52) U.S. Cl. .............................................. 701/99; 701/3
(58) Field of Classification Search .................. 701/3, 4, 701/8, 14, 99
See application file for complete search history.

(56) References Cited

U.S. PATENT DOCUMENTS

| | | | |
|---|---|---|---|
| 4,662,171 A | | 5/1987 | Jackson |
| 5,363,317 A | * | 11/1994 | Rice et al. .......................... 702/34 |
| 5,499,025 A | * | 3/1996 | Middleton et al. ............ 340/959 |
| 5,927,655 A | * | 7/1999 | Larramendy et al. ......... 244/195 |
| 6,695,264 B2 | * | 2/2004 | Schaeffer et al. ............. 244/223 |
| 2004/0111191 A1 | | 6/2004 | Muller |
| 2004/0129835 A1 | * | 7/2004 | Atkey et al. ................. 244/118.5 |
| 2006/0042846 A1 | * | 3/2006 | Kojori et al. ................. 180/65.8 |
| 2008/0208398 A1 | * | 8/2008 | Delaplace et al. ................ 701/3 |

FOREIGN PATENT DOCUMENTS

| | | |
|---|---|---|
| EP | 1 406 141 | 4/2004 |
| FR | 2 890 645 | 3/2007 |

OTHER PUBLICATIONS

Preliminary Search Report dated Jun. 23, 2009.

* cited by examiner

*Primary Examiner* — Hussein A. Elchanti
(74) *Attorney, Agent, or Firm* — Dickinson Wright PLLC

(57) ABSTRACT

Disclosed is a method and device for protecting an aircraft comprising at least one wing-mounted engine arranged on each of its wings against at least one of a low-energy situation and a high-energy situation during flight in which at least one engine is a failed engine. A control unit is triggered to activate a protection function, as a function of the number and position of failed engines. The control unit controls at least one non-failed engine, and the protection function is activated when activation conditions are met. The activation conditions indicate that the aircraft is either in the low-energy situation such that the total current power of the aircraft is less than a predetermined minimum power or that the aircraft is in the high-energy situation such that the total current power of the aircraft is greater than a predetermined maximum total power.

10 Claims, 3 Drawing Sheets

METHOD AND DEVICE FOR THE ENERGY PROTECTION OF AN AIRCRAFT

FIELD OF THE INVENTION

The present invention relates to a method and a device for the energy protection of an aircraft, particularly a four-engine aircraft, and to an aircraft provided with such a device.

BACKGROUND OF THE INVENTION

More specifically, said method is intended to protect the aircraft against low-energy (low speed, high incidence, low engine thrust) situations which may endanger the safety of the aircraft, particularly when the latter is close to the ground.

From document FR 2890645 it is known that a method such as this may influence the following customary steps:
  potential failures of the engines of the aircraft are detected;
  a plurality of parameters of the aircraft are measured; and
  a protection function that consists in automatically applying the maximum power, as a function of the number and positions of failed engines, to at least some of said non-failed engines of the aircraft so that they each provide maximum thrust, is activated when activation conditions dependent on the measured parameters are met.

However, applying a maximum power to at least some of the non-failed engines of the aircraft may reduce the maneuverability of this aircraft in low-energy conditions. The pilots of the aircraft then have only very limited, if any, control over the course of said aircraft, and this may lead to hazardous situations.

Further, such a method is devoted only to protecting the aircraft against low-energy situations. It is not able to cope with high-energy risk (high speed, high engine thrust) situations.

SUMMARY OF THE INVENTION

It is an object of the present invention to remedy these disadvantages and in particular to protect an aircraft against low-energy or high-energy situations that it may encounter during a flight, while at the same time maintaining a high level of maneuverability.

To this end, according to the invention, the method for the energy protection of an aircraft comprising at least one wing-mounted engine arranged on each of its wings, in which method the following steps are performed automatically:
  potential failures of said engines are detected;
  a plurality of parameters of said aircraft are measured;
  a protection function that consists in automatically controlling, as a function of the number and the position of the failed engines, at least some of said non-failed engines of said aircraft, is activated when activation conditions are met,
is notable:
A)—in that a speed threshold of said aircraft is calculated from at least some of the measured parameters of said aircraft;
B)—in that from said speed threshold, a total power to be applied to said engines of the aircraft in order to guarantee energy protection of said aircraft is determined; and
C)—in that when said activation conditions are met, the individual current power of each of said controlled non-failed engines is progressively modified in such a way that the sum of the modified individual powers of said controlled engines and of the individual current powers of the non-controlled engines is equal to the determined total power.

Thus, by virtue of the invention, the individual current power of each of the controlled non-failed engines is progressively adapted to reach the determined total power, so as gradually to get out of a potentially critical low-energy or high-energy situation while at the same time allowing the aircraft to maintain a high level of maneuverability. Furthermore, the crew can control the course of the aircraft when the protection function is activated.

Furthermore, advantageously, it is possible to detect potential asymmetry in the individual current powers of said controlled engines, and if asymmetry in the power of said aircraft is detected, the individual current powers of said controlled engines can be modified during step C) taking their current value into consideration so as to reduce said power asymmetry.

In a first embodiment of the present invention, in step A), a minimum speed threshold is calculated, and in step B), a minimum total power to keep the speed of said aircraft at least equal to said minimum speed threshold is determined. When the activation conditions are met, the individual current powers of said controlled engines are increased in such a way as to avoid a low-energy situation.

In this first embodiment, said activation conditions comprise a first condition relating to a need to activate said protection function, which is met when the total current power of said aircraft is less than said determined minimum total power.

Furthermore, in a second embodiment of the present invention, in step A), a maximum speed threshold is calculated, in step B), a maximum total power such that the speed of said aircraft is at most equal to said maximum speed threshold is determined. When the activation conditions are met, the individual current powers of said controlled engines are decreased in step c) in such a way as to get said aircraft out of a high-energy situation.

In this second embodiment, said activation conditions comprise a first condition relating to a need to activate said protection function which is met when the total current power of said aircraft is greater than said determined maximum total power.

Furthermore, whatever the embodiment of the present invention, said activation conditions comprise second conditions relating to an authorization to activate said protection function which have to be met simultaneously with said first condition. These second conditions are met if the following situations are simultaneously met:
  the altitude of said aircraft is greater than a predetermined altitude value, at the time of landing; and
  a plurality of particular systems of said aircraft, such as an air data reference unit of ADR (for "Air Data Reference") type, an inertial reference system of the IRS (for "Inertial Reference System") type, a radioaltimeter, a means of determining the air speed, and a means of determining the angle of incidence, is valid.

Once said protection function has been activated, the latter can be deactivated when at least one of the following conditions is met:
  said activation conditions are no longer met;
  all the engines mounted on one and the same wing of said aircraft have simultaneously failed.

Furthermore, said protection function can be deactivated through deliberate action on the part of the pilots of said aircraft using deactivation means. In this case, it is possible either:
  in the first embodiment, gradually to decrease said modified individual powers applied to said controlled engines in order to reach predetermined individual power values (for example the individual powers applied prior to activation of the protection function). In this way, a sudden loss of lift likely to disrupt longitudinal control of the aircraft is avoided;

in the second embodiment, gradually to increase said modified individual powers applied to said controlled engines in order to reach predetermined individual power values (for example the individual powers applied prior to activation of the protection function).

Moreover, whatever the embodiment of the invention, when said aircraft engines are prop fan engines, in step C), the individual powers of said controlled engines are aligned before changing the rotational speed of the rotors of said aircraft engines, if an asymmetry in power of said controlled engines is detected. This then guarantees that the rotor speeds of all the engines will be synchronized.

The invention also relates to an energy protection device for implementing the method as specified hereinabove, said device comprising:

detection means for detecting failures of said engines;

measurement means for measuring a plurality of parameters of said aircraft;

control means that can be triggered to activate said protection function consisting in automatically controlling, as a function of the number and the position of failed engines, at least some of said non-failed engines of said aircraft, said control means being triggered when said activation conditions are met; and triggering means for automatically monitoring at least some of said measured parameters of said aircraft and for automatically triggering said control means when said activation conditions are met.

According to the invention, said device additionally comprises:

calculation means capable of calculating said speed threshold from at least some of said measured parameters of said aircraft;

means able, from said speed threshold, to determine said total power to be applied to said engines in order to guarantee energy protection of said aircraft; and means able to determine said modified individual powers to be applied to at least some of said controlled non-failed engines such that the sum of the modified individual powers of said controlled engines and of the individual current powers of the non-controlled engines is equal to the determined total power, said means being activated when said activation conditions are met.

Furthermore, the device comprises means of inhibiting said protection function, which means are activated when at least one of the following conditions is met:

said activation conditions are no longer met;

all the engines mounted on one and the same wing of said aircraft have simultaneously failed.

In a first embodiment according to the invention, said calculation means are able to calculate a minimum speed threshold and said means of determining the total power are capable of determining a minimum total power to keep the speed of said aircraft at least equal to said minimum speed threshold.

By contrast, in a second embodiment according to the invention, said calculation means are capable of calculating a maximum speed threshold and said means of determining the total power are capable of determining a maximum total power in order to keep the speed of said aircraft at most equal to said maximum speed threshold.

Furthermore, the invention also relates to an aircraft provided with a device like the one mentioned hereinabove.

BRIEF DESCRIPTION OF THE DRAWINGS

The figures of the attached drawing will make it easy to understand how the invention may be embodied. In these figures, identical references denote elements which are similar.

DETAILED DESCRIPTION OF THE INVENTION

Figure 1:
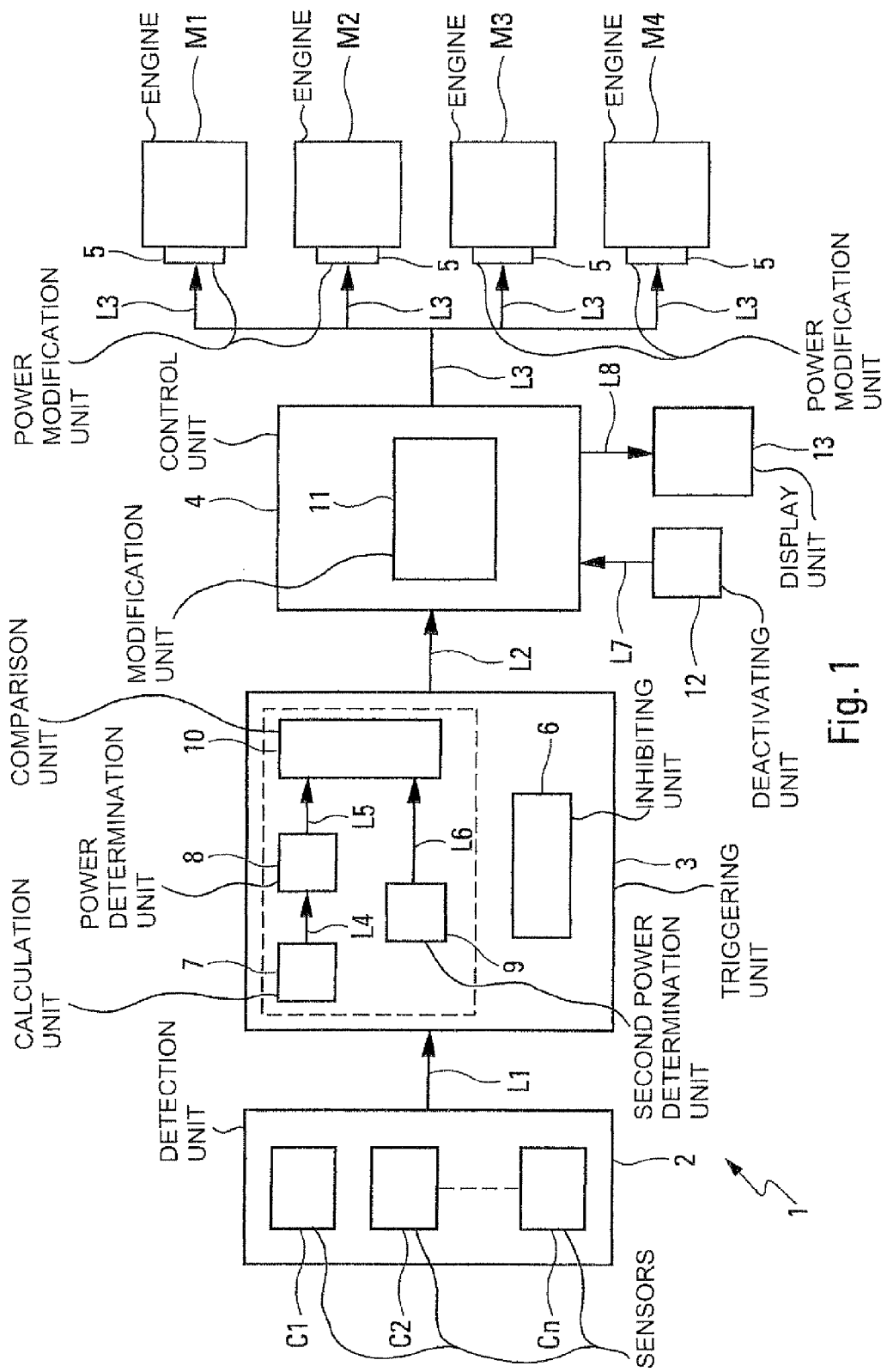
FIG. 1 depicts a block diagram of a device according to the invention.

FIG. 1, according to a first embodiment according to the present invention, schematically depicts an energy protection device 1 for an aircraft AC comprising four engines M1, M2, M3 and M4. A device 1 such as this is intended to protect the aircraft AC against low-energy (low speed, high incidence, low energy thrust) situations which may endanger the safety of the aircraft AC, particularly when close to the ground.

In the usual way, the device 1 comprises:

detection means belonging, for example, to a detection unit 2 for detecting all failures of the engines M1 to M4;

the detection unit 2 comprising a plurality of sensors C1, C2, . . . , Cn for respectively measuring at least some of the following parameters: the incidence of the aircraft AC, the roll angle and the pitch angle of said aircraft AC, the current speed of the aircraft AC, the radio altitude height of the aircraft AC (height relative to the ground), the Mach number of the aircraft AC, the position of the throttle levers that control the engine speed (and therefore the individual current power applied to each of the engines of the aircraft AC), engine parameters (engine speed) enabling an engine failure to be detected;

triggering means 3, connected via the link L1 to the detection unit 2, able automatically to monitor a plurality of specific parameters of said aircraft AC and automatically to trigger control means 4 when activation conditions (detailed hereinafter) are met;

the control means 4 connected by the link L2 to the triggering means 3.

The control means 4 can be triggered and are able to activate a protection function that consists in automatically, as a function of the number and position of those engines of the aircraft AC that have failed, of controlling at least some of the non-failed engines, when said activation conditions are met. To do this, the control means 4 are connected, via links L3, to customary means 5 intended to modify the individual current power of said engines M1 to M4, notably by modifying the supply of fuel thereto; and inhibition means 6, for example incorporated into the triggering means 3, capable of acting on the latter in such a way as to inhibit activation of the protection function.

More specifically, the inhibition means 6 are able to inhibit activation of said protection function (that is to say prevent or halt implementation of this function) when two engines mounted on one and the same wing B or C of the aircraft AC have simultaneously failed (see FIGS. 4 to 9) or when the activation conditions for said protection function are no longer met.

Of course, if the protection function is not activated or if its activation has been inhibited, the various engines M1 to M4 of the aircraft AC are controlled in the usual way in accordance with the usual commands generated particularly by the crew of the aircraft AC.

In this first embodiment, the triggering means 3 also comprise:
- calculation means 7 capable of calculating a minimum speed threshold that will guarantee the aircraft AC a decent level of maneuverability. This speed threshold is, for example, determined from data relating to the aircraft AC and, in particular, from: the current incidence, the current speed, the pitch and roll angles, the load factor. Of course, other parameters of the aircraft AC may be taken into consideration when calculating said threshold. It should be noted that this minimum speed threshold lies between the take-off speed and the lowest selectable speed (VLS);
- first determination means 8 connected to said calculation means 7 by the link L4, and capable of determining the minimum total power to share between the various engines of the aircraft AC so as to keep the speed of the latter at least equal to said minimum speed threshold calculated by the calculation means 7;
- second determination means 9 capable of determining the current total power applied to the collection of engines of the aircraft AC (the current total power being the sum of the individual current powers applied to each of the engines M1 to M4); and
- comparison means 10, connected to said first and second determining means 8 and 9 by links L5 and L6 respectively, which means are capable of making the comparison between the current total power and the minimum total power.

Furthermore, according to the first embodiment, the control means 4 comprise third determining means 11 capable of determining the modified individual powers to apply at least to some of the non-failed engines to be controlled, in such a way that the sum of the modified individual powers of said controlled engines and of the individual current powers of the non-controlled engines is at least equal to the minimum total power determined by the first determining means 8.

These third determining means 11 may take into consideration any potential asymmetry in the individual current powers of the controlled engines, so that the modified individual powers applied to each of said controlled engines (in order to reach the minimum total power) reduce this asymmetry.

Figure 2:
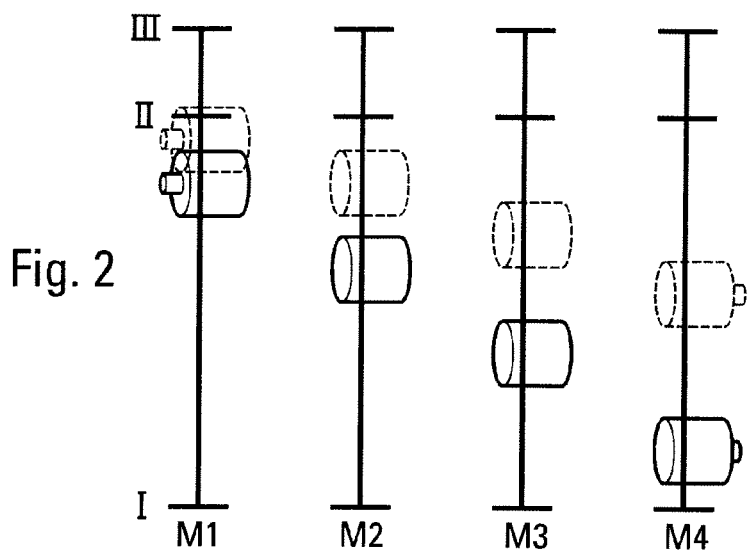
FIG. 2 illustrates an example of an asymmetric configuration of the throttle levers for the engines of the aircraft AC, leading to asymmetry of power in a low-energy situation, and the modified configuration determined by the device of FIG. 1.

Thus, FIG. 2 depicts one example of an asymmetric configuration of throttle levers that control the speed of the engines of the aircraft AC, giving rise to an asymmetry of power, and a modification (shown in dotted line in FIG. 2) to this configuration following activation of the protection function (the activation conditions are therefore satisfied) according to the invention. In this example, it is assumed that none of the engines M1 to M4 has failed. The customary positions I, II and III correspond respectively to idle speed, maximum speed and take off or go-around speed following an aborted landing.

As FIG. 2 shows, the lower the individual current power of the engines the higher the additional individual power applied to each of the engines in order to reach the minimum total power, thus making it possible to reduce the asymmetry in the power of the aircraft.

Moreover, as FIG. 1 shows, the device 1 according to the invention comprises manual deactivating means 12, connected by the link L7 to said control means 4, and which are able to be actuated by one of the pilots of the aircraft AC and which can deactivate said protection function when they are actuated. Thus, the pilot is able at any time to deactivate said protection function.

Said device 1 may also comprise display means 13, connected by the link L8 to said control means 4, and capable of displaying a message alerting the pilots of the aircraft AC to any activation of the protection function, for example by displaying an appropriate message on a screen, such as a primary flight display PFD (for "Primary Flight Display") for example. A message such as this may also indicate the additional total power added and how it is shared between the various controlled engines.

Activation of the protection function may further be signaled to the pilots of the aircraft via an audible alarm or sensory feedback on the controls.

It will be noted that deactivation of the protection function through deliberate action on the part of the pilots on manual deactivation means 12 does not result in the restoring of a satisfactory level of energy that does not place the aircraft AC at risk. Hence, it may be possible to envision displaying a message on the display means 13, in order to alert the pilots to the fact that the aircraft is still in a hazardous situation. A message such as this may disappear as soon as the aircraft gets out of such a low-energy situation.

In addition, if the pilots deliberately deactivate the protection function, the modified individual powers applied to said controlled engines may be decreased gradually in order to return to the individual powers determined in the usual way on the basis of the usual commands generated particularly by the crew of the aircraft AC.

According to the first embodiment, the triggering means 3 take into consideration, by way of activation conditions:
- a first condition relating to a need to trigger the protection function. This first condition is met when the current total power is less than said minimum total power; and
- second conditions relating to authorization to trigger the protection function, which are based on parameters of the aircraft AC and of systems of said aircraft AC. Said second conditions are met if the following situations are simultaneously met:
  - the altitude of said aircraft AC is greater than a predetermined altitude value, at the time of landing. The protection function is therefore inhibited on the ground, and even during landing, if the aircraft AC is situated too close to the ground; and
  - a plurality of specific systems of the aircraft AC, such as an air data reference unit of the ADR ("Air Data Reference"type, an inertial reference system of the IRS (for "Inertial Reference System") type, a radio-altimeter, a means of determining the air speed, and a means of determining the angle of incidence, is valid.

These first and second conditions have to be met simultaneously in order to cause the triggering of the control means 4.

Figure 3:
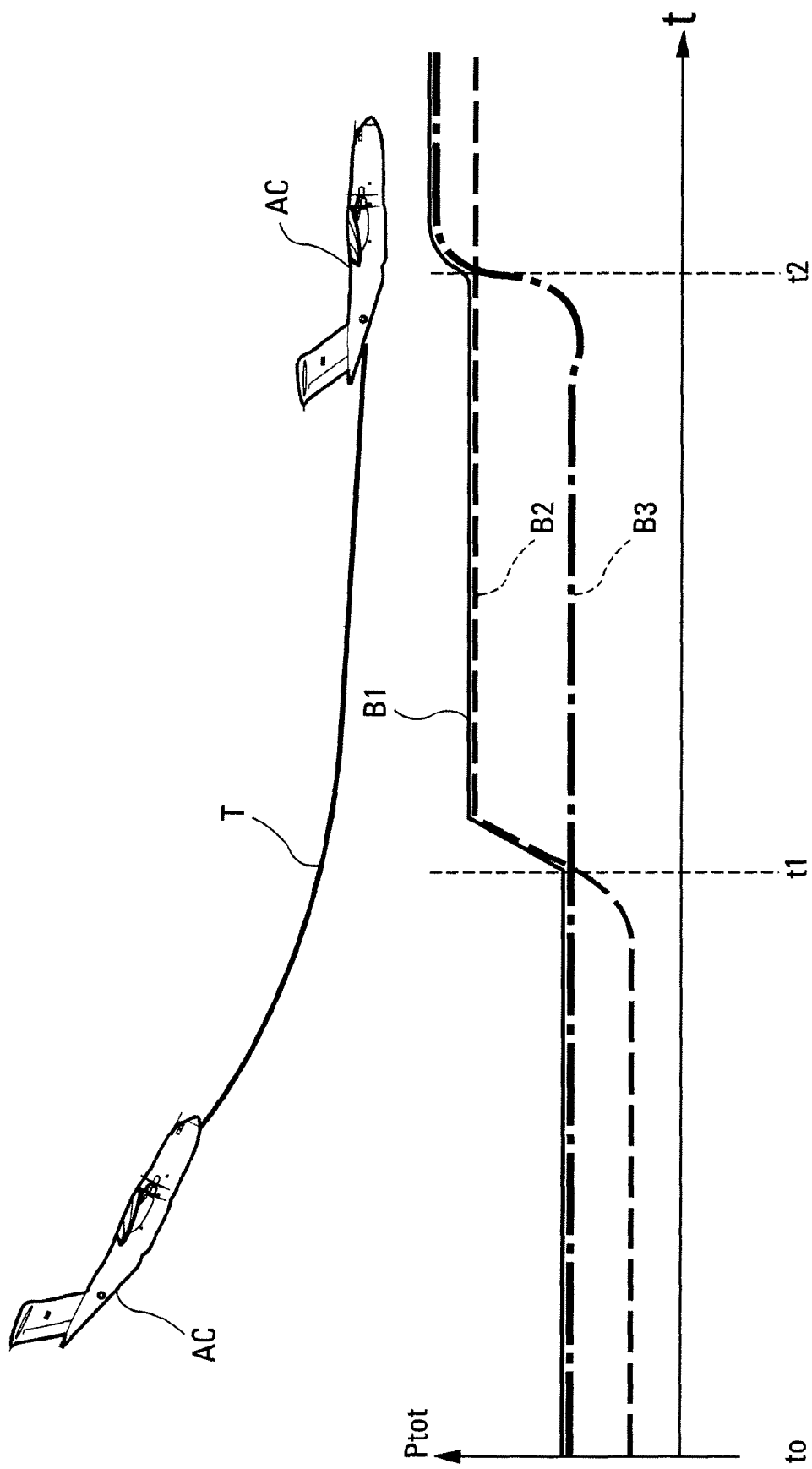
FIG. 3 is a diagram representing the change with respect to time in the total power applied to the engines of said aircraft, along a course T, according to the invention.

The diagram of FIG. 3 depicts the change with respect to time, along a course T of the aircraft AC, in:
- the total power (curve B1 in solid line) applied to the engines controlled by said protection function of the aircraft AC;

the minimum total power (curve B2 in dotted line) determined by the first determining means 8; and the total power determined in the usual way on the basis of the usual commands generated particularly by the crew of the aircraft AC (curve B3 drawn in chain line).

As FIG. 3 shows, between the times t0 and t1, the conditions for activation of the protection function are not met. The applied total power (curve B1) is therefore equal to the power determined in the usual way (curve in dotted line).

Between the times t1 and t2, the activation conditions are now met, the total power applied is then equal to the minimum total power (curve B2).

After the time t2, the activation conditions are no longer satisfied, which means that the total power applied is once again equal to the total power determined in the usual way.

Moreover, as mentioned hereinabove, the protection function is triggered each time the aforementioned appropriate conditions are satisfied. In addition, this protection function is inhibited only if two engines mounted on one and the same wing B or C of the aircraft AC have simultaneously failed.

FIGS. 4 to 9 schematically depict various possible situations, each time showing the aircraft AC with wings B or C. Each wing B, C has an outboard engine M1, M4 and an inboard engine M2, M3, with respect to the fuselage of the aircraft AC.

Figure 8:
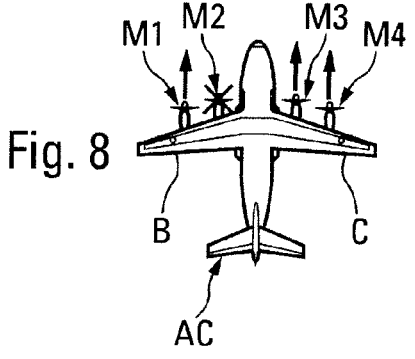

In these figures, said engines M1 to M4 are:
- depicted with a cross through them when failed (for example the engine M2 in FIG. 5);
- associated with an arrow when controlled in accordance with the invention (for example engines M1, M3 and M4 in FIG. 8). An arrow such as this illustrates the corresponding thrust (or traction); and
- depicted with neither a cross nor an arrow when they have not failed but are not being controlled in accordance with the invention, which means that they continue to generate an individual power representative of usual commands (for example the case of the engine M4 in FIG. 5).

Figure 4:
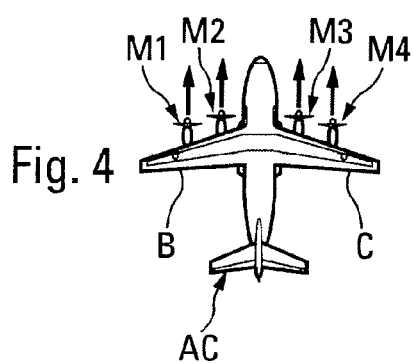
FIGS. 4 to 9 schematically illustrate an aircraft showing, as appropriate, the engines that have failed, the engines the power of which has not been modified and the engines the power of which has been modified in accordance with the present invention.
Figure 5:
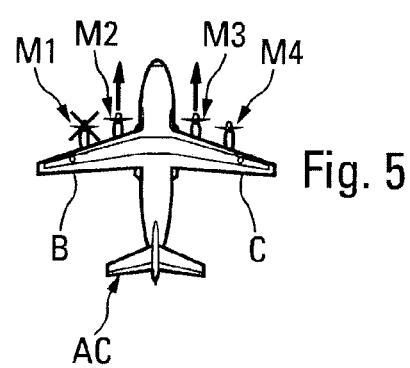
Figure 6:
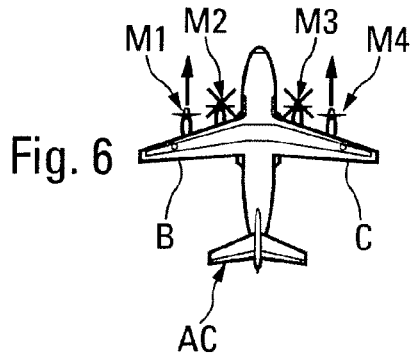
Figure 7:
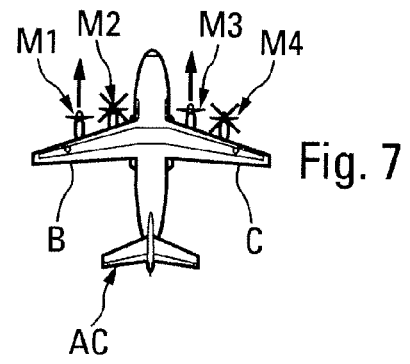
Figure 9:
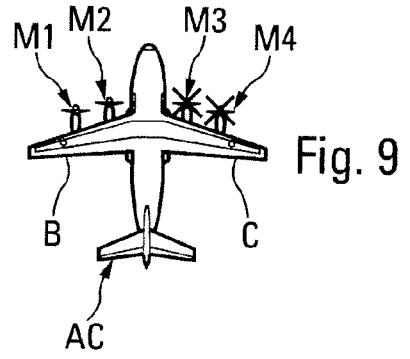

When the activation conditions are satisfied, the control means 4 are able to control the following engines of said aircraft AC:
- all the engines M1 to M4 if no engine has failed, as depicted in FIG. 4;
- the two inboard engines M2 and M3 if one of the outboard engines M1 or M4 has failed, as depicted in FIG. 5. This then limits the asymmetry in thrust;
- the remaining two engines, if two engines have failed but are not mounted on one and the same wing, as depicted in FIGS. 6 and 7;
- the three remaining engines, if one of the inboard engines M2 or M3 has failed, as depicted in FIG. 8; and
- none of the engines M1 to M4, if at least two engines have failed on one and the same wing, as depicted in FIG. 9. The protection function is then inhibited by the inhibition means.

In a second embodiment according to the invention, the energy protection device 1 is now intended to protect the aircraft AC against high-energy situations (high speed, high engine thrust) liable to endanger the safety of the aircraft AC.

To do this, the triggering means 3 of the device 1 are modified as follows:
- the calculation means 7 are able to calculate a maximum speed threshold determined in a similar way to the minimum speed threshold of the first embodiment;
- the first determining means 8 are able to determine the maximum total power to share between the various engines of the aircraft AC so as to keep the speed of the latter at most equal to said maximum speed threshold calculated by the calculating means 7; and
- the comparison means 10 are able to make the comparison between the current total power and the maximum total power.

Moreover, according to this second embodiment, the third determining means 11 are able to determine the modified individual powers to apply at least to some of the non-failed engines to be controlled, in such a way that the sum of the modified individual powers of said controlled engines and of the individual current powers of the non-controlled engines is at most equal to the maximum total power determined by the first determining means 8.

Furthermore, in this second embodiment, the activation conditions are also modified. Specifically, the first condition relating to a need to trigger the protection function is met when the current total power is greater than said maximum total power. The second conditions relating to authorization to trigger the protection function for their own part remain unchanged by comparison with the first embodiment.

The way in which the protection device of the second embodiment works is fairly similar to that of the first embodiment described hereinabove.

Of course, it would be possible to design a single composite energy protection device intended to protect the aircraft AC both against low-energy situations and against high-energy situations liable to endanger the safety of the aircraft AC.

The invention claimed is:

1. A method for protecting an aircraft comprising at least one wing-mounted engine arranged on each of its wings against at least one of a low-energy situation and a high-energy situation during flight in which at least one engine is a failed engine, the method comprising the steps of:
   detecting engine failure;
   measuring a plurality of parameters of said aircraft;
   triggering a control unit to activate a protection function, as a function of the number and position of failed engines, and control at least one non-failed engine of said aircraft, wherein the protection function is activated when activation conditions are met, with the activation conditions indicating that the aircraft is in the low-energy situation such that the total current power of the aircraft is less than a predetermined minimum power or that the aircraft is in the high-energy situation such that the total current power of the aircraft is greater than a predetermined maximum total power,
   wherein said triggering is carried out by a triggering unit, in which the triggering unit is configured to:
      A)—calculate a speed threshold of said aircraft from at least one of the measured parameters; and
      B)—determine from said calculated speed threshold, a total power to be applied to said engines of the aircraft in order to maintain the calculated speed threshold; and
   wherein said control unit is configured to:
      C)—determine, upon triggering by the triggering unit, a modification of power to each controlled non-failed engine such that a sum of the determined modified individual power to each of said controlled engines and of individual current power to each non-controlled engine is equal to the determined total power.

2. The method as claimed in claim 1,
wherein the protection function is deactivated when at least one of the following conditions is met:
   said activation conditions are no longer met;
   all engines mounted on one and the same wing of said aircraft have simultaneously failed.

3. The method as claimed in claim 1,
wherein:
asymmetry in the individual current power of said controlled engines is detected; and
upon detection of the asymmetry, the individual current power of said controlled engines is modified during step C) to reduce said power asymmetry.

4. The method as claimed in claim 1, wherein said activation conditions indicate the low-energy situation is met and said activation conditions comprise a first condition, and
wherein:
in step A), a minimum speed threshold is calculated;
in step B), a minimum total power to maintain speed of said aircraft at least equal to said minimum speed threshold is determined;
said first condition is met when the total current power of said aircraft is less than said determined minimum total power; and
in step C), the power of said controlled engines is increased to avoid the low-energy situation.

5. The method as claimed in claim 1, wherein said activation conditions indicate the high-energy situation is met and said activation conditions comprise a first condition,
wherein:
in step A), a maximum speed threshold is calculated;
in step B), a maximum total power to maintain speed of said aircraft of at most equal to said maximum speed threshold is determined;
said first condition is met when the total current power of said aircraft is greater than said determined maximum total power; and
in step C), the power of said controlled engines is decreased to avoid the high-energy situation.

6. The method as claimed in claim 4, wherein said activation conditions comprise a second condition to be met with said first condition,
wherein said second condition is met according to the following:
the aircraft altitude is greater than a predetermined altitude value, at the time of landing; and
a plurality of particular systems of said aircraft are validated.

7. The method as claimed in claim 4,
wherein:
said protection function is deactivated through application of a deactivation unit; and
upon deactivation, said modified individual power of said controlled engines is decreased to reach predetermined individual power values.

8. The method as claimed in claim 5,
wherein:
said protection function is deactivated through application of a deactivation unit; and
upon deactivation, said modified individual power of said controlled engines is increased to reach predetermined individual power values.

9. An energy protection device for protecting an aircraft comprising at least one wing-mounted engine on each wing against at least one of a low-energy situation and a high-energy situation during flight in which at least one engine is a failed-engine, said device comprising:
detection unit that detects engine failure;
measurement unit that measures a plurality of parameters of said aircraft;
control unit that, upon triggering, activates a protection function, as a function of the number and position of failed engines, and controls at least one non-failed engine of said aircraft; and
triggering unit that monitors at least one of said measured parameters and triggers said control unit when activation conditions are met, with the activation conditions indicating that the aircraft is in the low-energy situation such that the total current power of the aircraft is less than a predetermined minimum power or that the aircraft is in the high-energy situation such that the total current power of the aircraft is greater than a predetermined maximum total power,
wherein the triggering unit comprises:
calculation unit that calculates a speed threshold from at least one of said measured parameters; and
power determination unit that determines, from said calculated speed threshold, a total power to be applied to said engines in order to maintain the calculated speed threshold, and
wherein the control unit comprises:
modification unit that determines modification of power to each controlled non-failed engine such that a sum of the determined modified individual power of each of said controlled engines and of individual current power of each of the non-controlled engines is equal to the determined total power.

10. An aircraft, which comprises an energy protection device for protecting the aircraft comprising at least one wing-mounted engine on each wing against at least one of a low-energy situation and a high-energy situation during flight in which at least one engine is a failed-engine, said device comprising:
a detection unit that detects engine failure;
a measurement unit that measures a plurality of parameters of said aircraft;
a control unit that, upon triggering, activates a protection function as a function of the number and position of failed engines, and controls at least one non-failed engine of said aircraft; and
a triggering unit that monitors at least one of said measured parameters and triggers said control unit when activation conditions are met, with the activation conditions indicating that the aircraft is in the low-energy situation such that the total current power of the aircraft is less than a predetermined minimum power or that the aircraft is in the high-energy situation such that the total current power of the aircraft is greater than a predetermined maximum total power,
wherein the triggering unit comprises:
a calculation unit that calculates a speed threshold from at least one of said measured parameters; and
a power determination unit that determines, from said calculated speed threshold, a total power to be applied to said engines in order to maintain the calculated speed threshold; and
wherein the control unit comprises:
a modification unit that determines modification of power to each controlled non-failed engine such that a sum of the determined modified individual power of each of said controlled engines and of individual current power of each of the non-controlled engines is equal to the determined total power.

* * * * *